United States Patent [19]

Kurosu et al.

[11] Patent Number: 4,527,877
[45] Date of Patent: Jul. 9, 1985

[54] DEVICE FOR DETECTING THE TIME OF TERMINATION OF OPENING OPERATION OF SHUTTER BLADES OF AN ELECTROMAGNETIC PROGRAMMING SHUTTER

[75] Inventors: Tomio Kurosu, Iwatsuki; Yukio Yoshikawa, Tokyo, both of Japan

[73] Assignee: Copal Company Limited, Tokyo, Japan

[21] Appl. No.: 436,629

[22] Filed: Oct. 25, 1982

[30] Foreign Application Priority Data

Oct. 27, 1981 [JP] Japan ............................ 56-159801[U]

[51] Int. Cl.³ .............................................. G03B 9/08
[52] U.S. Cl. .............................................. 354/234.1
[58] Field of Search ....................... 354/26, 28, 29, 30, 354/34, 36, 38, 50, 51, 60 R, 139, 147, 234.1

[56] References Cited

U.S. PATENT DOCUMENTS

| 4,075,641 | 2/1978 | Uno et al. ........................ 354/60 R |
| 4,286,854 | 9/1981 | Seckendorf ........................ 354/129 |
| 4,413,892 | 11/1983 | Lambeth ............................ 354/266 |
| 4,418,999 | 12/1983 | Baxter .............................. 354/266 |

Primary Examiner—Russell E. Adams
Attorney, Agent, or Firm—McAulay, Fields, Fisher, Goldstein & Nissen

[57] ABSTRACT

The device for detecting the time of termination of the opening operation of shutter blades of an electromagnetic programming shutter comprises an induction coil secured to either one of a member coupled with the operation of the shutter blades and a base plate, a permanent magnet secured to the other one of the member and the base plate in facing relationship to the induction coil, and a detecting circuit for detecting the vanishing of the electric current induced in the induction coil resulting from the termination of the relative movement between the induction coil and the permanent magnet at the time of termination of the opening operation of the shutter blades after the shutter blades have initiated the opening operation from the closed positions for causing the relative movement between the induction coil and the permanent magnet so as to generate the induced current in the induction coil, thereby permitting the time of termination of the opening operation of the shutter blades to be detected. Since a programming shutter may initiate the closing operation of the shutter blades even though they have not been fully opened so as to serve as a diaphragm stop in order to obtain proper exposure, the time of termination of the opening operation of the shutter blades must be exactly detected in order to accurately actuate a stroboflash device. The present invention can detect very accurately the required time for the operation of the stroboflash device in the very simple and inexpensive manner without requiring undue loss of energy.

10 Claims, 7 Drawing Figures

DEVICE FOR DETECTING THE TIME OF TERMINATION OF OPENING OPERATION OF SHUTTER BLADES OF AN ELECTROMAGNETIC PROGRAMMING SHUTTER

BACKGROUND OF THE INVENTION

The present invention relates to a device for detecting the time of termination of opening operation of shutter blades of an electromagnetic programming shutter.

In an electromagnetic programming shutter in which the shutter blades serve also as a diaphragm aperture so that they may initiate closing operation before they are fully opened depending upon the scene brightness so as to limit the light quantity for achieving the proper exposure, it is required in order to obtain proper timing of operation of a stroboflash device that the time be detected at which the shutter blades initiates closing operation even before they are fully opened, i.e. the time at which the shutter blades attain the maximum aperture as the shutter blades initiate closing operation during the time they are being opened.

Heretofore, a device for detecting the time of termination of opening operation of the shutter blades of an electromagnetic shutter has been proposed in which electric contacts are secured to a shutter blade opening member and a shutter blade closing member, respectively, which are mechanically operated in coupled relationship thereto so that the then maximum aperture is detected. However, by such mechanically operated contacts, mechanical loads are given to these members so that the energy loss becomes too large to enable to use an electromagnetic shutter of a relatively small driving power.

Alternatively, another device has been proposed in which the timing of operating a stroboflash device is obtained by delaying a certain time period from the issuance of a shutter blade opening signal. In this case, however, an actually accurate timing can not be obtained because the actual time of attaining the maximum aperture is not detected.

In this connection, the present assignee filed a Japanese Utility Model Application which was publicly disclosed as Japanese Utility Model Public Discl. No. 54343/1979 in which a device for detecting the time of commencement of the opening operation or the time of attaining the maximum aperture of shutter blades of an electromagnetic shutter having a rotatable or stationary permanent magnet, comprises a stationary or movable electric coil electromagnetically coupled with the above rotatable or stationary permanent magnet, the rotatable permanent magnet or the movable electric coil being coupled with the shutter blades and being reciprocally rotated by a predetermined angle by supplying electric current to the coil in one direction for opening the shutter blades for a predetermined time period for the proper exposure depending upon the scene brightness and, thereafter, in the reversed direction for closing the shutter blades, an electromagnetic proximity or contactless switch being provided which is operated by utilizing the relative movement between a movable member moving in coupled relationship to the shutter blades and a stationary member thereby permitting the time of commencement of the opening operation or the time of attaining the maximum aperture of the shutter blades to be detected. In such a device, however, it is impossible to detect the operation of the shutter blades except for limited conditions under which the shutter blades reach the fully opened positions or they initiate an opening operation from the closed positions.

Therefore, in an electromagnetic programming shutter in which the shutter blades may initiate closing operation at various time even before they reach the fully opened positions depending upon the scene brightness, the time of termination of the opening operation of the shutter blades can not be detected thereby making it impossible to achieve proper operation of a stroboflash device used with such an electromagnetic programming shutter.

OBJECTS AND SUMMARY OF THE INVENTION

It is the object of the present invention to provide a device for detecting the time of termination of the opening operation of the shutter blades of an electromagnetic programming shutter for achieving proper timing of operation of a stroboflash device to be used with the shutter which device can exactly and accurately detect the required time even though the shutter blades are not fully opened without unduly loading mechanically the driving member of the shutter and with a minimum loss of energy for driving the shutter.

The above object is achieved in accordance with the present invention by the provision of a device for detecting the time of termination of the opening operation of the shutter blades of an electromagnetic programming shutter comprising an induction coil secured to either one of a member coupled with the operation of the shutter blades and a base plate, a permanent magnet secured to the other one of the member and the base plate in facing relationship to the induction coil, and a detecting circuit for detecting the vanishing of the electric current induced in the induction coil resulting from the termination of the relative movement between the induction coil and the permanent magnet at the time of termination of the opening operation of the shutter blades after the shutter blades have initiated the opening operation from the closed positions for causing the relative movement between the induction coil and the permanent magnet so as to generate the induced current in the induction coil, thereby permitting the time of termination of the opening operation of the shutter blades to be detected.

With the construction as described above the time of termination of the opening operation of the shutter blades can be exactly and accurately detected in a very simple and inexpensive manner without requiring undue loss of energy.

DETAILED DESCRIPTION OF THE PREFERRED EMBODIMENTS

Figure 1:
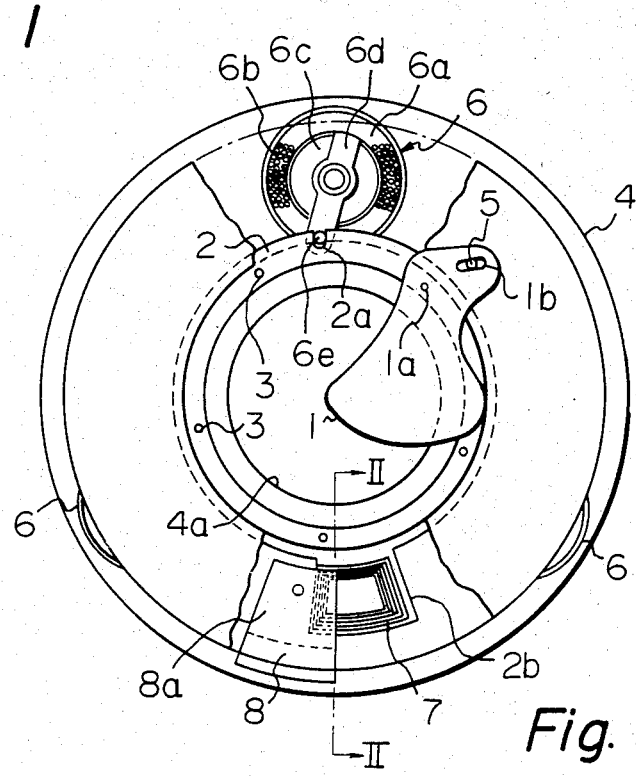
FIG. 1 is a plan view partly broken showing the main construction of an electromagnetic shutter in accordance with the present invention.

Referring now to FIG. 1 showing an electromagnetic programming shutter suitable for incorporating the device of the present invention, the shutter comprises five shutter blades 1 each having a circular hole 1a and an elongated hole 1b, the circular hole 1a being rotatably fitted with a pin 3 secured to a rotatable sector ring 2 while the elongated hole 1b is slidably engaged with a pin 5 provided on a sector supporting plate (not shown) located on a base plate 4 having an aperture 4a so that, when the sector ring 2 is rotated in the counterclockwise direction as shown in FIG. 1, the shutter blades 1 are in the closed positions, while, when the sector ring 2 is rotated from the position shown in FIG. 1 in the clockwise direction, the shutter blades 1 are brought to the opened positions.

In order to reciprocally rotate the sector ring 2 so as to move the shutter blades 1 between the closed positions and the opened positions, an electromagnetically driven motor 6 is provided. The motor 6 comprises a yoke 6a, a stationary electric coil 6b and a rotor 6c made of a permanent magnet and having an actuating arm 6d secured thereto. The arm 6d has a pin 6e secured to its free end and the pin 6e is slidably received in a U-shaped cut-out portion 2a formed in the sector ring 2 so that, when electric current is supplied to the stationary electric coil 6b in the predetermined direction, the rotor 6c is electromagnetically driven in the clockwise direction thereby rotating the sector ring 2 in the counterclockwise direction so as to move the shutter blades 1 to the closed positions, while, when electric current is supplied to the electric coil 6b in the reverse direction, the rotor 6c is rotated in the counterclockwise direction so as to rotate the sector ring 2 in the clockwise direction thereby moving the shutter blades 1 to the opened positions. It is evident that two or more motors 6 may be provided depending upon the requirement in design and performance. It is clear that the shutter blades 1 can initiate the closing operation even before they move to the fully opened positions after they have been opened from the closed positions by first supplying electric current in the reverse direction as described above to the electric coil 6b by a control circuit and then, after a predetermined time period as determined by the control circuit for the proper exposure, supplying to the coil 6b electric current in the predetermined direction described above even before the shutter blades 1 do not reach the fully opened position depending upon the scene brightness, thereby permitting the shutter to operate as a programming shutter in which the shutter blades 1 serve also as a diaphragm aperture.

Figure 2:
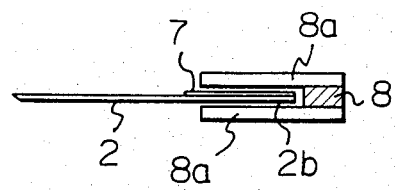
FIG. 2 is a fragmentary sectional view as seen in the direction of the arrow II—II in FIG. 1.

In accordance with the characteristic feature of the present invention, an outwardly projecting lug 2b is formed in the periphery of the sector ring 2 as shown in FIGS. 1 and 2, and an induction coil 7 which may be a printed coil or a wound coil of electric wire is secured to the lug 2b. A permanent magnet 8 is secured to the base plate 4 adjacent to the outer end of the lug 2b and a pair of magnetizable yokes 8a, 8a are secured to the upper surface and the lower surface of the permanent magnet 8, respectively, which are positioned in closely spaced facing relationship to the lug 2b as shown in FIG. 2 so that the magnetic flux of the permanent magnet 8 passes perpendicularly through the surface of the coil 7 by means of the yokes 8a, 8a.

Figure 3:
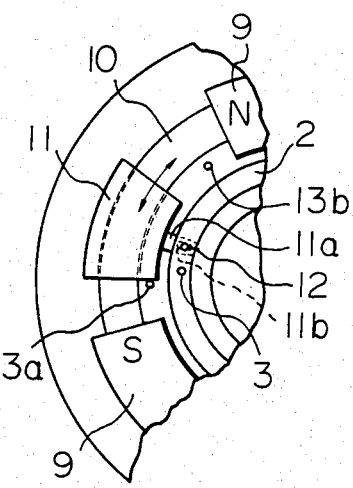
FIG. 3 is a fragmentary plan view showing an alternative form of the shutter of FIG. 1.

FIG. 3 shows an alternative form of the electromagnetic shutter. This shutter comprises a plurality of permanent magnets 9 connected by arcuate cores 10 so as to be arranged circularly, and the same number of movable electric coils 11 as the permanent magnets 9 are shiftably mounted on the arcuate cores 10, respectively. Each coil 11 has an inwardly projecting arm 11a having an elongated hole 11b at its inner end in which a pin 12 provided on the sector ring 2 is engaged so that the sector ring 2 is rotated integrally with the shifting movement of each coil 11 along the arcuate core 10 so as to move the shutter blades 1 to the opened positions or to the closed positions when electric current is supplied to each coil 11 in one direction or in the reverse direction.

Stopper pins 13a and 13b secured to the base plate serve to limit the movement of each coil 11 correspondingly to the closed positions and the opened positions of the shutter blades, respectively.

With the electromagnetic shutter as described above, when a shutter releasing signal is supplied by the control circuit so as to energize the electric coil 6b of the motor 6 or the electric coils 11 in one direction to initiate the opening operation of the shutter blades 1 from the closed positions, a relative movement will take place between the induction coil 7 and the yokes 8a, 8a thereby generating an induced voltage in the coil 7. After a time period as set by the control circuit for the proper exposure, a shutter blade closing signal is issued so as to energize the motor 6 or the electric coils 11 in the reverse direction to initiate the closing operation of the shutter blades 1 even before they are fully opened depending upon the scene brightness, thereby permitting the shutter blades 1 to first terminate the opening operation so as to render them to be held momentarily stationary and then to commence the closing operation of the shutter blades 1. When the shutter blade closing signal is issued after the shutter blades 1 are fully opened, it is clear that the shutter blades 1 are held stationary in the fully opened position until the shutter blade closing signal is issued and, at the moment the signal is issued, the closing operation of the shutter blades 1 commences.

In any event, when the shutter blades 1 terminate the opening operation after the opening operation thereof has been initiated so that an induced voltage has been generated in the induction coil 7, i.e. when the shutter blades 1 reach the then maximum aperture and are momentarily held thereat stationary, the induced voltage vanishes by virtue of the vanishing of the relative movement between the induction coil 7 and the permanent magnet 8. This vanishing of the induced voltage is utilized in the present invention for detecting the time of termination of the opening operation or the time of attainment of the then maximum aperture of the shutter blades 1 which permits the optimum operation of a stroboflash device used with the shutter.

Figure 4:
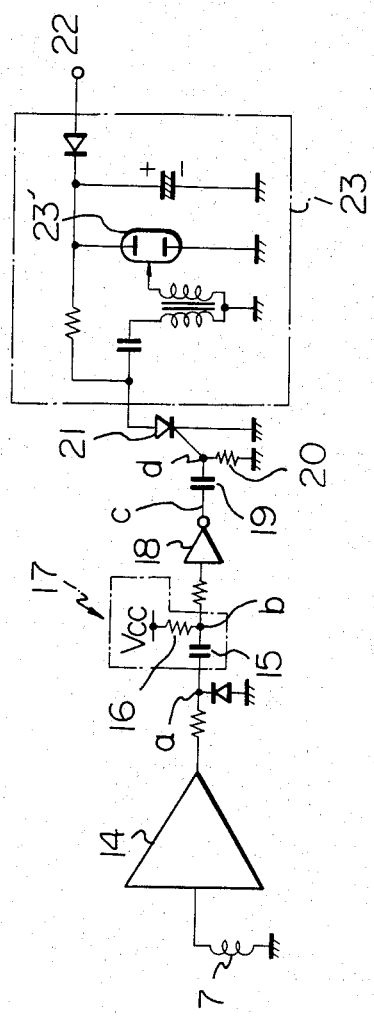
FIG. 4 is a diagram showing the control circuit of the present invention to be used with a stroboflash device.

FIG. 4 shows the control circuit of the present invention in which the induction coil 7 is utilized as a synchronizing trigger circuit for a stroboflash device actuating circuit.

The induced voltage of the induction coil 7 described above is supplied to a shaping amplifier 14, the output of which is supplied through a resistance to a differentiation circuit 17 consisting of a condenser 15 and a resistance 16 and energized by the power source voltage $V_{cc}$. The output of the differentiation circuit 17 is supplied through a resistance and an invertor 18 to one end of a condenser 19, the other end of which is grounded through a resistance 20 while it is connected to the gate of a thyrister 21. The cathode of the thyrister 21 is grounded while the anode thereof is connected to a stroboflash device actuating circuit 23 having a strobodischarge tube 23' and energized by a power source 22 for the stroboflash device.

The voltage at the output c of the inverter 18 is in its initial state at "L" level inverted from the power source voltage $V_{cc}$.

When an induced voltage is generated in the induction coil 7 as the shutter blades 1 initiate the opening operation, the voltage at the output a of the shaping amplifier 14 through the resistance is rendered to be "H" level so that a positive differentiated pulse is generated at the junction b between the condenser 15 and the resistance 16 constituting the differentiation circuit 17. During the time the induced voltage is being generated in the induction coil 7, the voltage at the output c of the inverter 18 is held continuingly at "L" level from the initial state.

When the induced voltage in the induction coil 7 vanishes as the opening operation of the shutter blades 1 terminates so that the voltage at the point a is inverted to "L" level, a negative differentiated pulse is generated at the point b. As a result, a positive pulse is generated at the output c of the inverter 18 so that a positive differentiated pulse is generated at the junction d between the condenser 19 and the thyrister 21 to be triggered.

Thus, the strobo-discharge tube 23' in the stroboflash device actuating circuit 23 emits a stroboflash light at the moment the shutter blades 1 attain the then maximum aperture.

The voltage at the output c of the inverter 18 restores its initial state by the action of the condenser 15 so as to be rendered to be "L" level to be ready for the succeeding operation.

Figure 5:
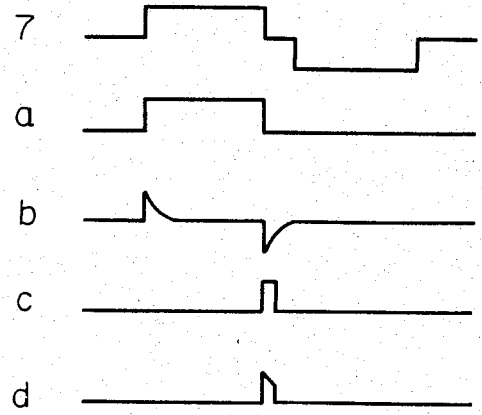
FIG. 5 is a time chart showing the operation of the circuit of FIG. 4.
Figure 5:
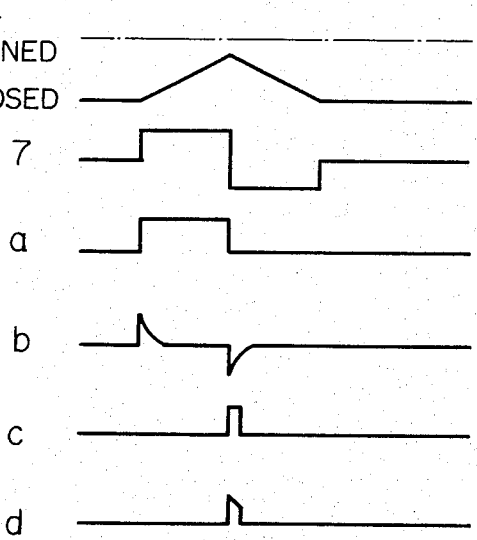

FIG. 5 shows the time chart of the operation of the control circuit shown in FIG. 4 in cooperation with the stroboflash device actuating circuit 23.

Figure 6:
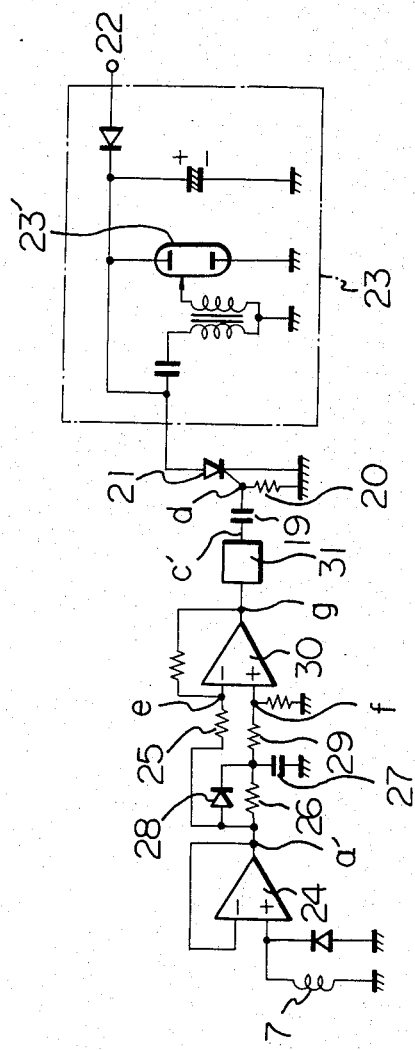
FIG. 6 is a diagram showing another embodiment of the circuit of FIG. 4.

FIG. 6 shows an alternative embodiment of the control circuit shown in FIG. 4.

In this embodiment, the electrical connection is so constructed that the induced voltage generated in the induction coil 7 is supplied to an operational amplifier 24 acting as a buffer circuit, the impedance modulated or converted output of which is supplied, on one hand, through a resistance 25 to a minus or inverted input of an operational amplifier 30 and, on the other hand, through a resistance 26 and an integration circuit constituted by a condenser 27 and a diode 28 and through a resistance 29 to the plus or non-inverted input of the operational amplifier 30, and the output of the operational amplifier 30 is supplied to a one shot multivibrator circuit 31.

In operation, when an induced voltage is generated in the induction coil 7 as the opening operation of the shutter blades 1 is initiated, the voltage of the output a' of the operational amplifier 24 is rendered to be "H" level. This "H" level output is supplied, on one hand, through the resistance 25 to the minus or inverted input of the operational amplifier 30 and, on the other hand, through the resistance 26, the condenser 27, the diode 28 and the resistance 29 to the plus or non-inverted input of the operational amplifier 30. Thus, the voltage at the point e and the point f are held during the time beginning from the initial state and insofar as the induced voltage is being generated in the induction coil 7 at the same voltage with each other or the former is maintained higher than the latter. Therefore, during the time period described above, the voltage at the output g of the operational amplifier 30 is held at "L" level.

When the opening operation of the shutter blades 1 terminate that the induced voltage in the induction coil 7, vanishes the voltage at the point e is promptly inverted into "L" level, whereas the voltage at the point f is gradually lowered from "H" level to "L" level by the integrating operation of the resistance 26 and the condenser 27 constituting the integration circuit.

Therefore, the voltage at the output g of the operational amplifier 30 is raised to "H" level and then lowered gradually to "L" level. This means that the one shot multivibrator circuit 31 receives a positive pulse so that a positive pulse having a determined width is generated at the output c' which results in generating a positive differentiated pulse at the junction d between the condenser 19 and the resistance 20 so as to trigger the thyrister 21.

Thus, at the moment the shutter blades 1 attain the then maximum aperture, the stroboflash tube 23' of the stroboflash device actuating circuit 23 emits the stroboflash light.

Figure 7:
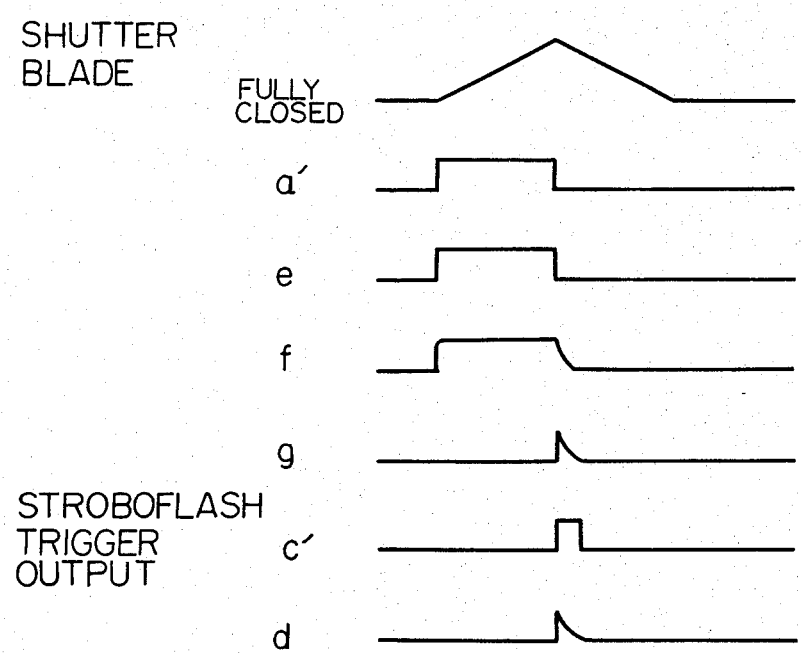
FIG. 7 is a time chart showing the operation of the circuit of FIG. 6 in which the stroboflash device is actuated.

FIG. 7 shows a time chart showing the operation of the control circuit of FIG. 6 in cooperation with the stroboflash device actuating circuit 23.

As described above, the present invention insures the optimum operation of a stroboflash device in a simple and inexpensive manner without undue loss of energy.

What is claimed is:

1. Device for detecting the termination of the opening operation of shutter blades of an electromagnetic programming shutter in which at least one of the opening operation and the closing operation of said shutter blades is electromagnetically controlled, comprising:
   a rotatable sector ring connected to said shutter blades,
   an induction coil secured to said rotatable sector ring,
   a permanent magnet secured to a base plate in facing relationship to said induction coil, and
   a detecting circuit for detecting the vanishing of the electric current induced in said induction coil resulting from the termination of the relative movement between said induction coil and said permanent magnet at the time of termination of the opening operation of said shutter blades after said shutter blades have initiated the opening operation from the closed positions for causing the relative movement between said induction coil and said permanent magnet so as to generate the induced electric current in said induction coil, thereby permitting the time of termination of the opening operation of said shutter blades to be detected by said detecting circuit.

2. The device as defined in claim 1, wherein a printed circuit constituting said induction coil is secured in the periphery of said ring.

3. The device of claim 1, having a plurality of permanent magnets, said magnets being connected by arcuate cores and a number of movable coils equal to the number of magnets shiftably mounted on said cores, each of said coils being operatively connected to said ring to rotate said ring and actuate said shutters when current is supplied to each of said coils in one direction or the other.

4. The device of claim 3, further having stop means on said base plate to limit the movement of each coil correspondingly to the open and closed positions of said blades.

5. The device of claim 1, having an electromagnetically driven motor connected to said ring reciprocally rotating said ring in response to the direction of the current supplied to said motor.

6. The device of claim 1, including a pair of magnetizable yokes secured to the upper and lower surfaces of said magnet.

7. Device for detecting the time of termination of the opening operation of shutter blades of an electromagnetic programming shutter in which at least one of the opening operation and the closing operation of said shutter blades is electromagnetically controlled, comprising:
- an induction coil secured to either one of a member coupled with the operation of said shutter blades and a base plate,
- a permanent magnet secured to said base plate in facing relationship to said induction coil,
- a pair of magnetizable yokes secured to the upper and lower surfaces of said magnet, and
- a detecting circuit for detecting the vanishing of the electric current induced in said induction coil resulting from the termination of the relative movement between said induction coil and said permanent magnet at the time of termination of the opening operation of said shutter blades after said shutter blades have initiated the opening operation from the closed positions for causing the relative movement between said induction coil and said permanent magnet so as to generate the induced electric current in said induction coil, thereby permitting the time of termination of the opening operation of said shutter blades to be detected by said detecting circuit.

8. The device of claim 7, having a plurality of permanent magnets, said magnets being connected by arcuate cores and a number of movable coils equal to the number of magnets shiftably mounted on said cores, each of said coils being operatively connected to said ring to rotate said ring and actuate said shutters when current is supplied to each of said coils in one direction or the other.

9. The device of claim 8, further having stop means on said base plate to limit the movement of each coil correspondingly to the open and closed positions of said blades.

10. The device of claim 7, having an electromagnetically driven motor connected to said ring and reciprocally rotating said ring in response to the direction of the current supplied to said motor.

* * * * *